United States Patent [19]

Luitje et al.

[11] Patent Number: 4,930,094
[45] Date of Patent: May 29, 1990

[54] VEHICLE SERIAL BUS, MECHANICAL INSTRUMENT CLUSTER ODOMETER THEREFOR

[75] Inventors: William V. Luitje, Ann Arbor; John M. McCambridge, Northville, both of Mich.

[73] Assignee: Chrysler Corporation, Highland Park, Mich.

[21] Appl. No.: 217,596

[22] Filed: Jul. 11, 1988

[51] Int. Cl.$^5$ .................. G01C 22/00; G06F 15/20
[52] U.S. Cl. .................. 364/561; 235/95 R; 235/96; 318/696; 340/815.08; 364/467
[58] Field of Search .................. 364/561, 565, 426.04, 364/467; 318/685, 696; 235/33, 95 R, 95 A, 96; 340/815.08

[56] References Cited

U.S. PATENT DOCUMENTS

| | | | |
|---|---|---|---|
| 3,812,332 | 5/1974 | Woodward | 235/96 |
| 4,559,637 | 12/1985 | Weber | 364/561 |
| 4,562,395 | 12/1985 | Rüb et al. | 318/685 |
| 4,568,866 | 2/1986 | Floro et al. | 318/685 |
| 4,734,847 | 3/1988 | Hunter | 318/696 |
| 4,796,210 | 1/1989 | Dubuisson et al. | 364/565 |

Primary Examiner—Kevin J. Teska
Attorney, Agent, or Firm—Wendell K. Fredericks

[57] ABSTRACT

A method and firmware/hardware system for updating an analog odometer using a pulse rate rather than an absolute number of updating pulse signals. The pulse rate is developed from a number that represents an accumulation of a series of pulses that represent distance traveled by a vehicle during a chosen interval.

7 Claims, 4 Drawing Sheets

VEHICLE SERIAL BUS, MECHANICAL INSTRUMENT CLUSTER ODOMETER THEREFOR

BACKGROUND OF THE INVENTION

1. Field of the Invention

The present invention relates generally to mechanical instrument clusters employing stepper motors for providing analog indications of vehicle measurands and, more particularly, techniques which permit interfacing a stepper motor driven mechanical odometer to a serial data communications link of a vehicle.

2. Description of the Prior Art

In prior art systems, a distance sensor, such as a conventional electromagnetic transducer placed in a transmission gearbox of a vehicle, develops pulse signals proportional to the distance traveled by the vehicle. These pulse signals are wired directly to the input of a stepper motor driver circuit. Such an arrangement lacks compatibility with serial data links employing data communication multiplexing. If the mechanical odometer requires a stepper motor input signal, then a system must provide pulses to the stepper motor proportional to the distance traveled by the vehicle.

Data communication multiplexed networks usually interconnect intelligent modules such as an engine controller, a body controller, a vehicle instrument cluster and other electronic modules. Each intelligent module sends messages such as distance pulse information over the link to one or more of the other modules.

In a multiplexed network such as this, the distance pulse information is used by several devices such as a speedometer, a trip computer, an electronic odometer and a mechanical odometer.

In one prior art system, priority schemes permit the intelligent modules to communicate in sequence in accordance with the priority or importance of the message. The engine controller and body controller share sensor response information on the intermodule data communications network. Sensor response information broadcasts occur on the link at various chosen intervals. But, however, distance sensor information broadcasts which occur every 0.344 seconds create gaps in the distance data supplied to the instrument cluster. In the case of an electronic odometer, these gaps are of no consequence since the information is accumulated digitally. However, in the case of a mechanical odometer, the distance pulse information is stored as the analog position of gears and numbered wheels and there is a difficult problem in adapting the digital and intermittent nature of the distance pulse transmissions to the continuous motion of these gears and wheels.

An electrically driven mechanical odometer consists of a stepper motor driving reduction gears which, in turn, drive numbered display wheels. The most straightforward way to drive such an odometer dictates stepping the stepper motor in proportion to the distance sensor count in the message sent over the link. Illustratively, since there are 4000 stepper motor pulses per mile and 8000 distance sensor counts per mile, it would appear that just pulsing the stepper motor a number of times equal to half the received distance sensor counts per mile number would yield proper operation. This approach implies that an odometer driver circuit could receive the distance sensor count information, then drive a stepper motor as fast as possible and then wait for the next distance sensor count information to appear on the link. This approach does not actually permit proper operation.

To understand the problems with this scheme, a more detailed understanding of the operation of the stepper motor is necessary. When the stator coils of the stepper motor are properly energized, the rotor will move or "step" to the next increment of its angular position, typically about a degree. The rotor does not take up its new position instantaneously, however. The rotor itself and the gear train and numbered wheels to which it is connected have a considerable amount of inertia. When the stator coils are energized, the current passing through them generates a magnetic field which exerts a force upon the rotor and gear train assembly. The speed with which the rotor moves is inversely proportional to its inertia and proportional to the force exerted upon it. Since the force is small and the inertia is considerable, the movement takes a small but finite time to happen. If a second and third step commands are given to the motor before it has completed the motion for the first, these commands cannot be carried out because the rotor is not in the correct position and, hence, the motor stops. It is important to understand that if the rotor is already moving when a step command is given to the motor, then it will take less time for it to reach the next step position since there will be less inertia for the force generated by the stator coils to overcome; hence, the motor can be driven faster.

Now, consider the problem of designing a stepper motor drive system as discussed above where some proportion of distance counts are used to step the stepper motor the appropriate number of times when the new distance information is received over the communications link. Due to the force and inertia constraints just discussed, a delay time between the issuance of step pulses must be specified since the step command cannot be carried out instantaneously. However, all of the odometer step pulses must be given in the interval between broadcasts of the distance count information or else the odometer would fall behind in displaying the correct distance. In the prior art system discussed above, the delay necessitated by mechanical factors dictates a delay so long that at 50 miles per hour or greater, the odometer would fall behind. At 65 miles per hour, only two hours driving would put the odometer 30 miles behind where it should be, clearly an unacceptable situation. Other possible solutions are scarcely better. For example, by designing a more powerful stepper motor, the inter-step delay could be reduced but at the cost of designing, tooling, building and stocking a more costly and bulkier non-standard stepper motor. Another approach might be to make the stepper motor driver circuit responsible for varying the delay time based on vehicle speed but this would require considerable circuitry to implement and, hence, drive up the cost of that circuit to an unacceptable level.

A better solution is to drive the stepper motor at the rate necessary to produce the correct odometer movement. At high vehicle speeds, the odometer is rolling continuously so there is never the problem of a long delay between pulses. The change in stepper motor rotor speed is always small and well within the torque capability of the standard motor. This novel approach resulted in the firmware/hardware techniques employed in the present invention.

SUMMARY OF THE INVENTION

A stepper motor for an odometer in the mechanical instrument cluster of the present invention steps at a given rate in response to rate values computed by the body controller unit based on the number of distance sensor counts received from the engine control unit during a chosen interval. Since it may not be possible to find a rate which produces the exact number of pulses required by the latest message on the link, the body controller unit also has to maintain an error term consisting of the number of distance sensor counts not yet stepped by the stepper motor. A firmware algorithm for including the error term with the distance sensor counts permits overcoming the rotor inertia/torque deficiency of the stepper motor when responding to a full range of distance sensor counts broadcast over the link. Also, the rotor of the stepper motor continually runs because a pulse rate rather than an absolute number of pulses steps the stepper motor that drives the odometer.

DETAILED DESCRIPTION OF A PREFERRED EMBODIMENT

Figure 1:
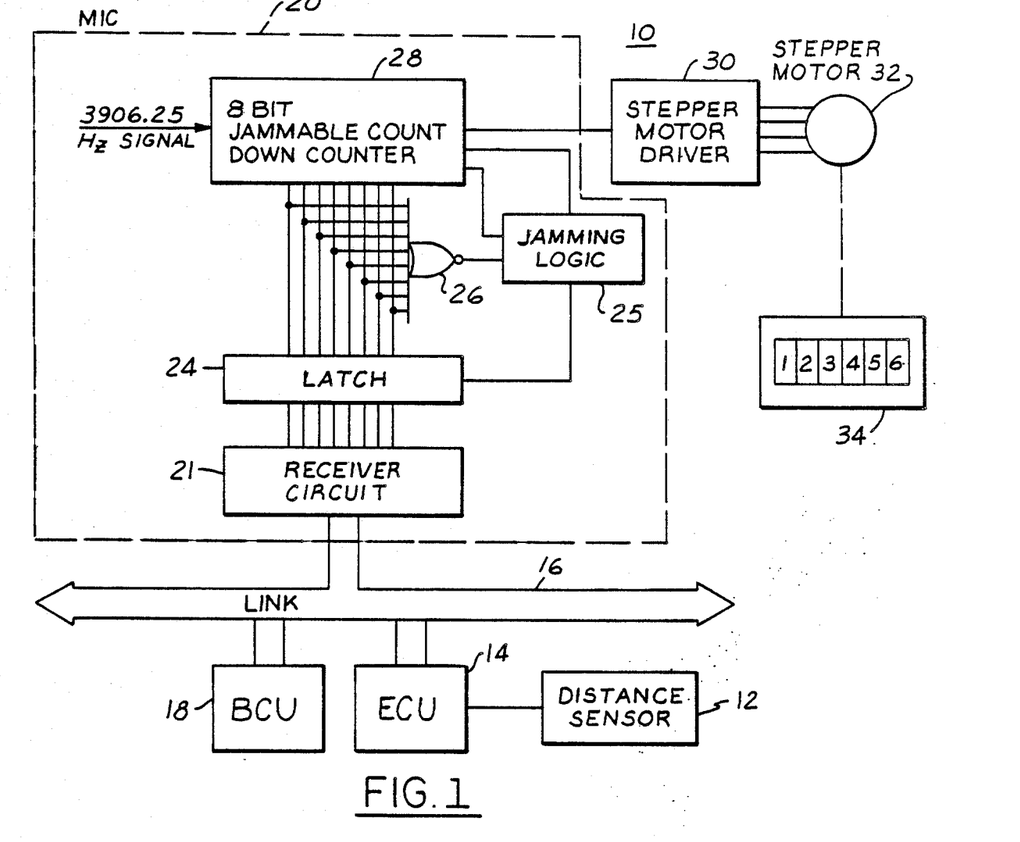
FIG. 1 is a block diagram of a serial data communications network and stepper motor driver circuitry which sets the operating environment for driving a mechanical odometer in accordance with the invention.

With reference to FIG. 1, in a block diagram of a preferred embodiment of an odometer network 10, sensor 12 provides vehicle-travel distance information to an engine controller unit (ECU)14. Distance sensor 12, a conventional electromechanical transducer, usually mounted on a portion of a drive train of a vehicle, acts as a ground switch providing a series of ON and OFF ground switch closures at a defined rate, e.g., 8000 switch closures per mile traveled to an input port of a computer circuit (not shown) in ECU 14. The computer circuit in ECU 14 increments a counter which counts the switch closures and then converts the counts into sequential counts/time interval data before transmitting this information, along with other engine condition data, over a serial link 16 in a chosen message format. The converted count/time interval data message format consists of a message (ID) byte and a data byte used to designate an 8 bit binary code of a value proportional to the distance the vehicle travels during the predetermined time interval.

Standard universal asynchronous receiver transmitters (UARTs) type modules (not shown) and non-return-to-zero (NRZ) coding move data over the link. However, other alternative codes such as NRZ Inverted and Manchester coding may suffice. The UART modules convert standard parallel digital logic level signals into NRZ coded serial data for transmission over link 16.

Body controller (BCU)18, which intercepts the coded data broadcast over link 16 by ECU 14, processes and converts the distance/time interval number values into a coded message format usable by a mechanical instrument cluster driver integrated circuit (MIC) 20. Then, within chosen transfer intervals, BCU 18 transmits coded messages to MIC 20 at a rate suitable for updating a mechanical odometer 34.

The MIC 20, which interfaces directly with link 16, intercepts the messages transmitted from BCU 18 at a rate illustratively of 7812.5 baud and then processes the messages to convert the data in each message to a form usable for updating the analog displays of the cluster such as odometer 34.

A message sent between BCU 18 and MIC 20 comprises an identification byte, a data0 and a data1 byte. A byte in this embodiment is defined as a start bit, eight (8) data bits and one (1) stop bit. Prior to transmission of a message, link 16 maintains ten (10) bit times of idle (i.e., the logic level on link 16 remains at a logic 1 for ten bit times). Separate messages transmitted sequentially provide data for each parameter displayed. Also, ten (10) bit times of idle separate each message. A message comprises 30 bits of data which includes one ID byte and two data bytes.

Before explaining the message processing operation for the odometer 34, a list of the various constraints imposed on system 10 follows. Firstly, in this embodiment, the microprocessors located in ECU 14 and BCU 18 have limitations on processing time since maintaining an odometer is only one of the many tasks they must perform. Secondly, MIC 20 does not contain a CPU and can do no computations. It does not transmit data. It only receives codes representing the parameters from BCU 18. Thirdly, link 16, essentially a twisted pair of wires, has band-width limitations. It has restrictions with respect to data transfer rates. Link 16 cannot handle very high frequency rates; it transfers no more than 10 kilobytes of data per second. Fourthly, distance information transmitted from ECU 14 over link 16 can occur only at certain intervals, i.e. every 344 ms. Fifthly, the odometer must behave as a standard odometer that produces generally regular odometer indication and movement including providing comparable or greater accuracy. Sixthly, there is a need for a sufficient resolution of the distance parameter information being supplied to MIC 20 by BCU 18 so that reasonably small increments of distance show up and produce a reasonable change in odometer indications.

To appreciate these constraints, consider the 8000 switch closures of distance sensor 12 as equivalent to one (1) mile of travel of the vehicle. ECU 14 counts the switch closures and transmits, synchronously, a number representing an accumulation of the counts or distance counts over link 16 illustratively at 344 ms intervals to BCU 18. BCU 18 converts the distance counts into an 8-bit binary code message and then transmits the message over link 16 to a receiver 21 in MIC 20. Jamming logic 25 sequentially loads a jammable counter 28 with updates of the 8-bit binary numbers from latch 24. Jammable counter 28 counts down from the updated 8-bit binary number to 0 and then to −1. During the transition from 0 to −1, counter 28 issues a pulse to a stepper motor driver 30 which drives a stepper motor 32 which in turn operates a conventional odometer 34 consisting of a plurality of gear driven wheels, each marked with a series of integer numbers for indicating an accumulation of mileage traveled by the vehicle.

Jammable counter 28, clocked illustratively by a 3906.25 Hz signal, and loaded from latch network 24 with numerical values derived from the codes transmitted from BCU 18 to the receiver circuit 21 of MIC 20, counts down from binary values ranging from 255 to 1 decimal before issuing a pulse to the stepper motor driver 30 which subsequently drives stepper motor 32 which in turn drives odometer 34. The values loaded in counter 28, illustratively in 8-bit binary code represent the odometer step rate from BCU 18. The pulse issued from counter 28 and routed to the stepper motor driver 30 occurs when counter 28 counts beyond 0 to $-1$ (a numerical value of 255). With counter 28 at $-1$, latch network 24 and jamming logic 25 jam the next count value into counter 28 causing counter 28 to again count down from the jammed-in value down to zero again and then to issue another pulse to the stepper motor driver 30. The generation of pulses to the stepper motor driver occurs at a rate dictated by the numerical values placed in latch network 24. Latch network 24 and counter 28 generate a series of pulses for controlling driver 30 at a rate commensurate with the distance traveled by the vehicle. If the vehicle is stopped, then the stepper motor pulses must also be stopped. To allow this, jammable counter 28 is inhibited from counting and, hence, from producing stepper motor pulses while the number in latch 24 is zero by the NOR gate 26 and jamming logic 25. In this way, BCU 18 can turn off the production of stepper motor pulses by sending a value of zero over link 16 which is then received and stored in latch 24.

The following equation (1) provides a relationship between the stepper counts supplied to counter 28 and the distance counts sent over link 16 from ECU 14 to BCU 18:

$$\text{Stepper ct} = ((Hz*Interval*Sensor/Stepper)/Distance\ ct) - 1 \quad (1)$$

where "Stepper ct"$\neq$is the value of the count jammed into counter 28; "Hz" is the counter clock rate (3906.25 Hz); "Interval" is the time in seconds between distance message transmissions (0.344 seconds); "Sensor/Stepper" is the number of distance sensor counts per stepper pulse which, in this embodiment, equals "2" since a two-to-one ratio exists between the "Distance ct" per mile from sensor 12 to the stepper motor pulses per mile of motor 32; and "Distance ct" is the number of distance counts coded in the link message from ECU 14 to BCU 18 which varies with vehicle speed. The "negative one ($-1$)" term comes from the fact that the counter pulses the stepper motor when it counts from 0 to $-1$, not when it counts from 1 to 0.

Since counter 28 is only an eight-bit counter, an obvious problem results at low speeds where the distance counts from ECU 14 range below or equal to 10 ((1 mi/8000 cts*3600sec/1hr)/0.344sec=1.308 mi/hr/ct then 11 ct * 1.308 mi/hr/ct=13.08 mph)) since the stepper count values computed by firmware in BCU 18 will exceed 255 decimal; i.e., a binary number greater than 1111 1111 would be transmitted to MIC 20 for loading into counter 28. A number greater than 255 may be 256 which equals 1 0000 0000 binary. Turning off counter 28 by sending a value of zero (0) to MIC 20 provides a partial solution to the overfilled counter but yields an inaccurate odometer reading. Turning off counter 28 for any length of time creates an error; e.g., if counter 28 is turned off to accommodate a distance count of 10 from ECU 14, this means that there are 10 distance counts that have not been recorded on the odometer.

At high speeds, this scheme presents resolution problems. For example, consecutive counter values of one (1) and two (2) in counter 28 differ by 50% in the number of stepper motor pulses supplied in any period.

Solution of both of these difficulties results by having BCU 18 continually adjust the "Stepper ct" value to minimize the error and by maintaining residual error values which represent the number of distance counts which have not been turned into odometer step pulses. Upon receipt of new distance information, a summation of the current distance count and a previous error value occurs to provide a distance number for use in equation (1) for computing the stepper ct used during the interval between distance information transmissions. The error term is computed as in equation 2.

$$\text{Error} = \text{Distance} - \frac{(Hz*Interval*Sensor/Stepper)}{\text{Stepper ct} + 1} \quad (2)$$

Where "Distance" represents the current distance count plus the previous error value; and "Stepper ct" represents the count value computed in equation (1), with the other terms remaining as those in equation (1). The error is set to zero when BCU 18 is first used; thereafter, the error term is saved until BCU 18 is disconnected.

Figure 2:
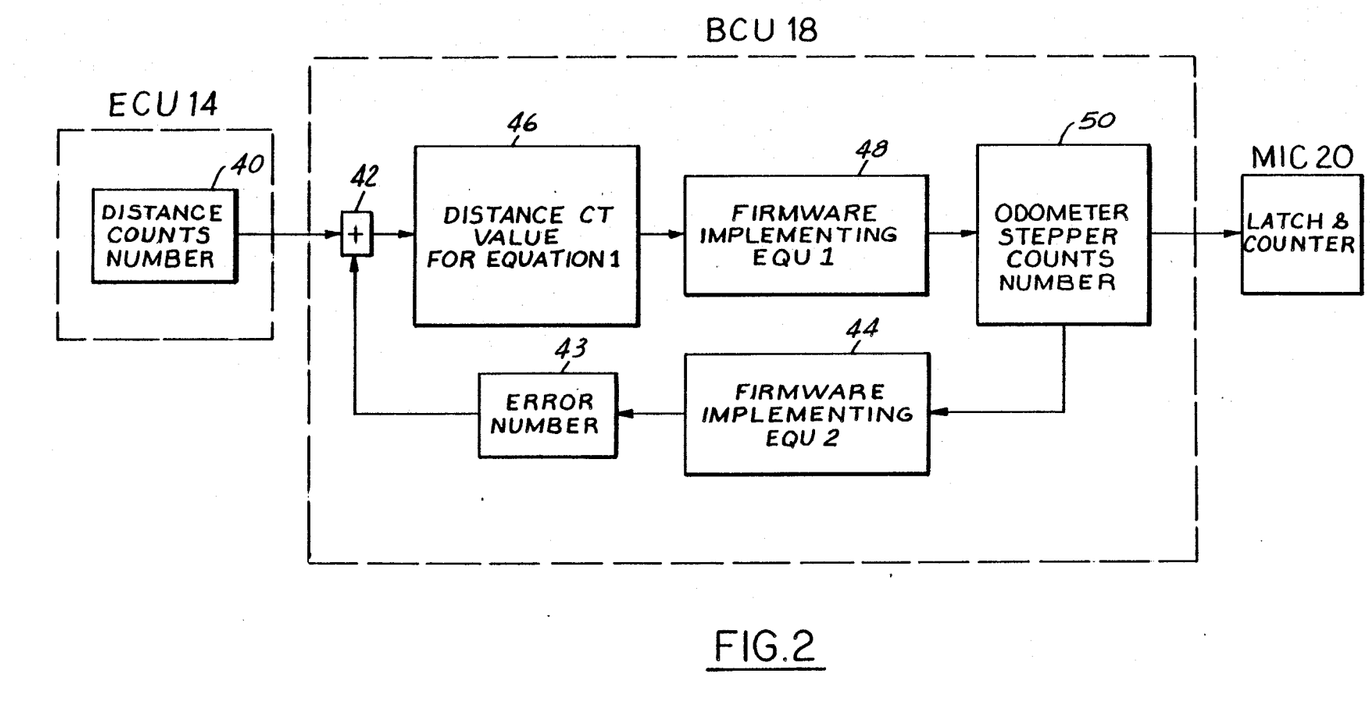
FIG. 2 is a block diagram illustrative of data and data flow in the body controller unit employed to establish a rate rather than an absolute number for stepping the stepper motor of the odometer.

A block diagram in FIG. 2 depicts data flow in the system in general and, in particular, in BCU 18 to establish a rate rather than an absolute number for stepping the stepper motor 32 of odometer 34 of FIG. 1. Distance count message, represented in block 40 of FIG. 2, from ECU 14 summed in summing block 42 with an error value computed in equation (2) and depicted in block 44 provides a real number in block 46 representing Distance ct for use in equation (1) depicted as block 48 which, when solved, provides the "Stepper ct", depicted in block 50, sent to receiver circuit 21 of FIG. 1 in MIC 20. Storing the error value in a battery backed memory (not shown) in BCU 18 during ignition OFF prevents ignition cycling from producing any systematic error accumulation.

With this scheme, the odometer reading always lags the updated distance information from ECU 14 by, at most, a few counts and, at some speeds, the updated distance count value changes every time interval to adjust for accumulated errors. Since the error value never accumulates to more than a few thousandths of a mile, very little odometer accuracy loss results during battery disconnect which should only occur a few times in the life of the vehicle.

The computation of the error value can be simplified if the error is always positive. This can be assured by taking a ceiling function of "Stepper ct" computed in equation equation (1) before inserting the "Stepper ct" value in equation (2). The ceiling function returns the smallest integer which is greater than or equal to its argument. For example, the ceiling function applied to an argument of 2.001 yields the value 3 and, applied to an argument of 2.000, yields 2.

OPERATION OF THE SYSTEM

In discussing the operation of the system, refer again to FIG. 1. Let us assume that a vehicle, equipped with a data communications system of the type depicted in FIG. 1, travels along at about 14 miles per hour and that ECU 14 sends out a value of "11" as a "Distance ct" message to BCU 18 in response to this speed.

BCU 18 includes equation (1) as an algorithm in firmware for computing the "Stepper ct". Substituting "11" as the "Distance ct" yields the following equation (3):

$$\begin{aligned} \text{Stepper ct} &= ((3906.25\text{Hz} * 0.344\text{sec} * 2) / 11) - 1 \quad (3)\\ &= (2687.5 / 11) - 1 \\ &= 243.318 \text{ Stepper cts, and by taking the ceiling function} \\ &= 244 \text{ Stepper cts.} \end{aligned}$$

BCU 18 sends this "Stepper ct" to MIC 20 as an 8-bit binary number where receiver circuit 21 transfers the number 244 to latch network 24 which, with the aid of jamming circuit 25, jams the number in counter 28.

Also, at this time, BCU 18 uses the results from equation (3) in another algorithm, i.e., equation (2) in the form of firmware for computing the error value. Substituting the "Stepper ct" value of 244 cts into equation (2) yields the following error value:

$$\begin{aligned} \text{Error} &= 11 \text{ cts} - (3906.25 \text{ Hz} * 0.344 \text{ sec} * 2) / (244 \text{ cts} + 1) \quad (4)\\ &= 11 \text{ cts} - (2687.5 / (244 + 1)) \\ &= 11 - 10.97 \text{cts} \\ &= 0.03 \text{ "Distance cts"} \end{aligned}$$

The 0.03 "Distance cts" value represents less than 4 millionths of a mile, i.e., (0.03 ct/8000 cts/mi.) yields 3.7 millionth of a mile.

With reference again to FIGS. 1 and 2, relating the above computations to the data flow through BCU 18, Distance ct of 11 sent by ECU 14 (block 40) to BCU 18 enters summing gate (block 42) to be summed with the error value (block 43) computed using equation (2). But, assuming no error previously existed, the Distance ct value remains 11 (block 46), hence the computations of equation 1 (block 48) yields 244 odometer Stepper cts (block 50). Thus, BCU 18 transmits 244 to MIC 20 where receiver circuit 21 stores this value in latch 24 and then latch 24 and the jamming logic 25 initiates counter 28 to this value the next time it counts from 0 to −1. Counter 28 then counts down from 244 to 0 and issues a pulse to stepper motor driver 30 as the count continues beyond 0 to −1. Stepper motor driver 30 in turn steps stepper motor 32 one stepper motor increment so as to cause the wheels of odometer 34 to turn one increment.

BCU 18 also uses the value 244 in error equation (2) to compute an error value (block 43) which is summed (block 42) with the next distance count.

Figure 3:
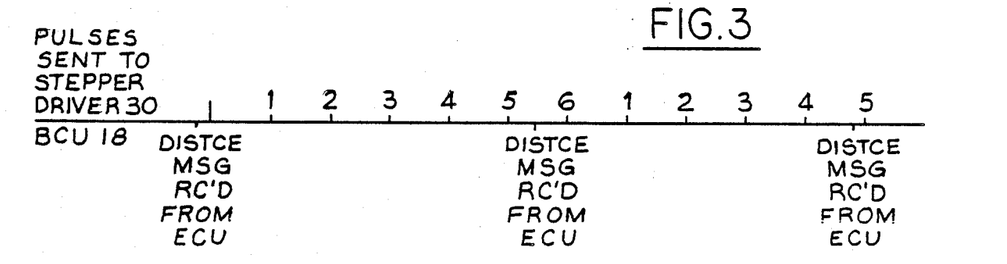
FIGS. 3 and 4 are timing diagrams illustrative of the relationship between the time of receipt of a distance message and the pulses issued by the stepper motor driver.

Since the value of 244 "Stepper cts" is latched in latch network 24 during the initial 0.344 second interval, and since counter 28 is clocked at 3906.25 Hz, then each "Stepper ct" is clocked through counter 28 within 256 microseconds, i.e., 1/3906.25 Hz. Since latch 24 holds a count of 244 during this initial interval and since the odometer stepper pulse is produced when counter 28 counts beyond 0 to −1, then the pulse rate for odometer 34 is computed by using the value 245 cts rather than 244 counts to yield a pulse rate of 0.06272 second (245 cts * 256 microseconds equals 0.06272 second). To determine how many pulses are issued during this initial interval, the interval period is divided by the pulse rate yielding 0.344 ms/0.06272 microsecond which equals 5.4846 pulses during the initial interval. FIG. 3 depicts these results.

With reference now to FIG. 3, a timing diagram shows above the horizontal time line dashes or "ticks" that represent the stepper motor pulses issued by counter 28 of FIG. 1 as the counter repeatedly counts down 5.4846 times in response to the "Stepper ct" latched in latch network 24 while the "ticks" below the horizontal line depict receipt of the "Distance ct" messages sent to BCU 18 by ECU 14.

Notice that actually six (6) stepper driver pulses occur due to the first distance count message and that only (5) pulses occur as a result of the second message. This correctly yields approximately 5.5 pulses per distance message on average. Under this circumstance, the error term of Equation (4) represents only very little accumulation of the excess of the distance count. Note also that at less than 11 distance counts per interval, 255 or greater stepper counts result. This necessitates stopping the odometer stepper motor until the accumulated distance error exceeds 10 because counter 28 can count only 255 different logic states. But, however, the scheme of this embodiment permits accounting for the distance cts that are not stepped by this procedure of accumulating the error values until the error exceeds 10.

Figure 4:
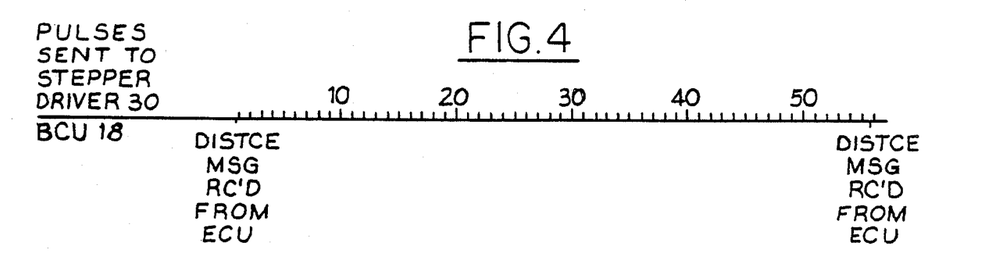

As an example at the other extreme of speed, consider a situation when the vehicle travels at about 152 mph so as to give 116 "Distance cts" per message. Using Equations 1 and 2, the value of 23 results for the "Stepper ct" and 4 results as the "Error" (these conditions yield nearly the maximum error possible at this speed). This time, 55.99 stepper pulses occur per period as shown in FIG. 4. If no feedback existed (Equation 2), 56 stepper pulses would result during 99 intervals and then the 100th interval would contain 55 stepper pulses.

As these calculations demonstrate, the combination of many periods and the error feedback mechanism as shown in FIG. 2 produces very accurate odometer readings over time just as for the previous example. This scheme compensates for the worst case conditions at high rates of speed where small changes in speed produces very little, if any, change in the odometer "Stepper cts". For example, also at 113, 114 and 115 "Distance cts", the "Stepper ct" remains 23 after applying the ceiling function which reveals that at higher speeds, error feedback is necessary to compensate for the lack of counter resolution. At the other extreme, where speeds are slow, Distance cts below 11 yields Stepper cts greater than 255 and the odometer has to be turned off until enough error counts are accumulated.

The above examples show that the odometer stepping method used in this embodiment produces very accurate odometer readings assuming constant update periods and vehicle speeds. In an actual vehicle, of course, neither of these extreme conditions hold. But because of the contention for time on link 16 by all the devices connected to it, the update period may vary 10 or 20 ms and the vehicle speed may vary from 0 to over 100 mph. A problem results if the update period varies; then the odometer step rate may stay in effect too long (or not long enough) and the estimate of the number of odometer stepper pulses actually issued may be wrong because of some change in speed. This will, in fact, cause a small error but, because of the way that the messages are transmitted over link 16, if a message is delayed one time, it will likely come sooner the next time. Since the update period can be longer or shorter and the change in speed can be an acceleration or deceleration, the error can be either positive or negative. The period fluctuations and speed fluctuations are independent of each other and hence, over time, the errors will tend to cancel each other out.

A question may arise as to how big of an error results due to these effects. The worst case happens when decelerating from a high speed. Deceleration causes adverse effects because a vehicle's brakes are usually more powerful than its engine and can change its velocity more quickly. High speeds cause adverse effects because the distance changes rapidly. A representative Chrysler model vehicle takes at least 270 feet to stop from 80 mph. Stopping from this speed occurs in about 4.6 sec. Assuming constant deceleration throughout the braking, the deceleration is 17.4 mph/sec or 6.0 mph per distance update interval. To compute the worst case error, assume the vehicle travels 80 mph (the distance counts=61) and precisely at the beginning of the distance sampling period, worst case braking causes a 6 mph change by the end of the period and a delay of 30 ms occurs for the distance counts message. At 80 mph, a stepper pulse results every 11.52 ms; so, if a 30 ms delay of the distance message count occurs, 2.60 stepper counts will result during the delay. To compute the number of pulses which should be given, refer to Equation 5 which is the textbook equation for distance traveled during a constant deceleration from an initial velocity:

$$d = v * t + (a * t^2)/2 \quad (5)$$

Where "d" is the distance travelled, "v" is the initial velocity or 177 distance count/sec, "t" is the length of time (0.344 seconds), and "a" is the deceleration ($-17.4$ mph/sec) or 38.67 distance counts/sec, we can calculate that the next distance count message will equal 58. BCU 18 will compute a new count value such that the stepper driver 30 will produce stepper pulses every 11.78 ms. The error then equals the error that comes about during the 30 ms delay when 2.60 pulses issued when 2.54 should have issued, i.e., (30 ms/one pulse per 11.78 ms), a difference of 0.06 pulse or 7.5 millionths of a mile or 0.46 inch.

Figure 5:
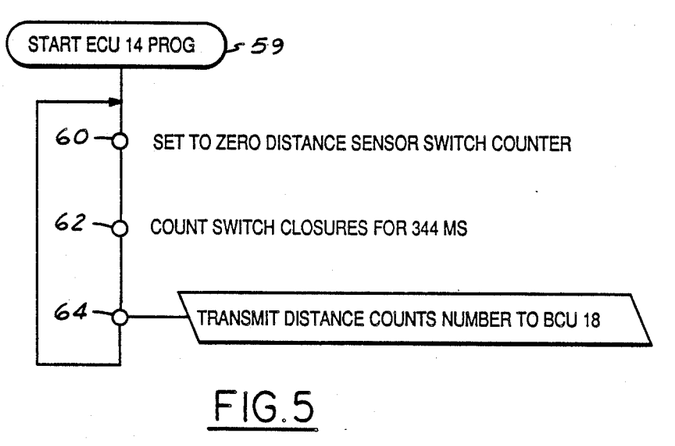
FIGS. 5 and 6 depict a flow chart of program performed by computer circuits in ECU 14 and BCU 18 respectively during operation of odometer network 10.
Figure 6:
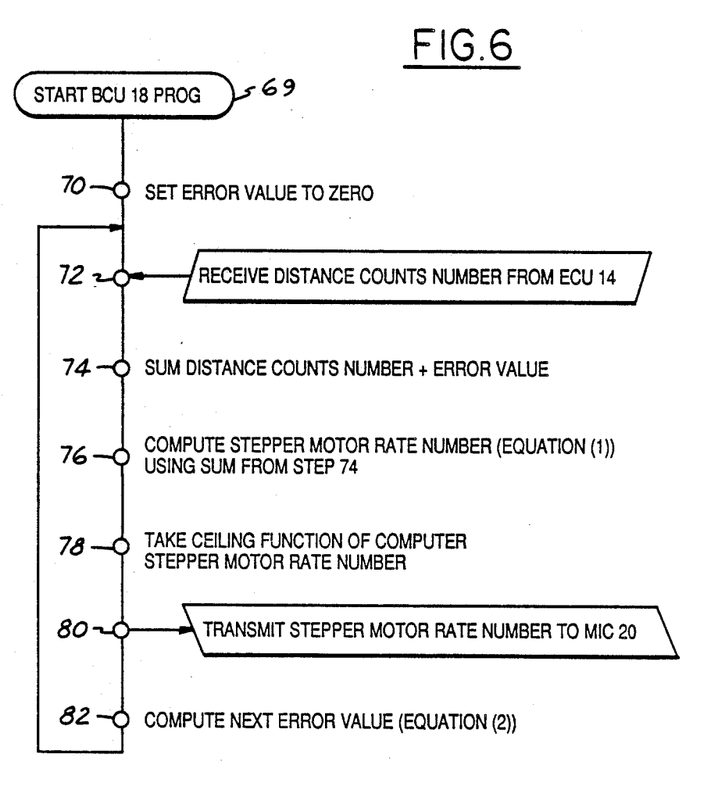
Figure 7:
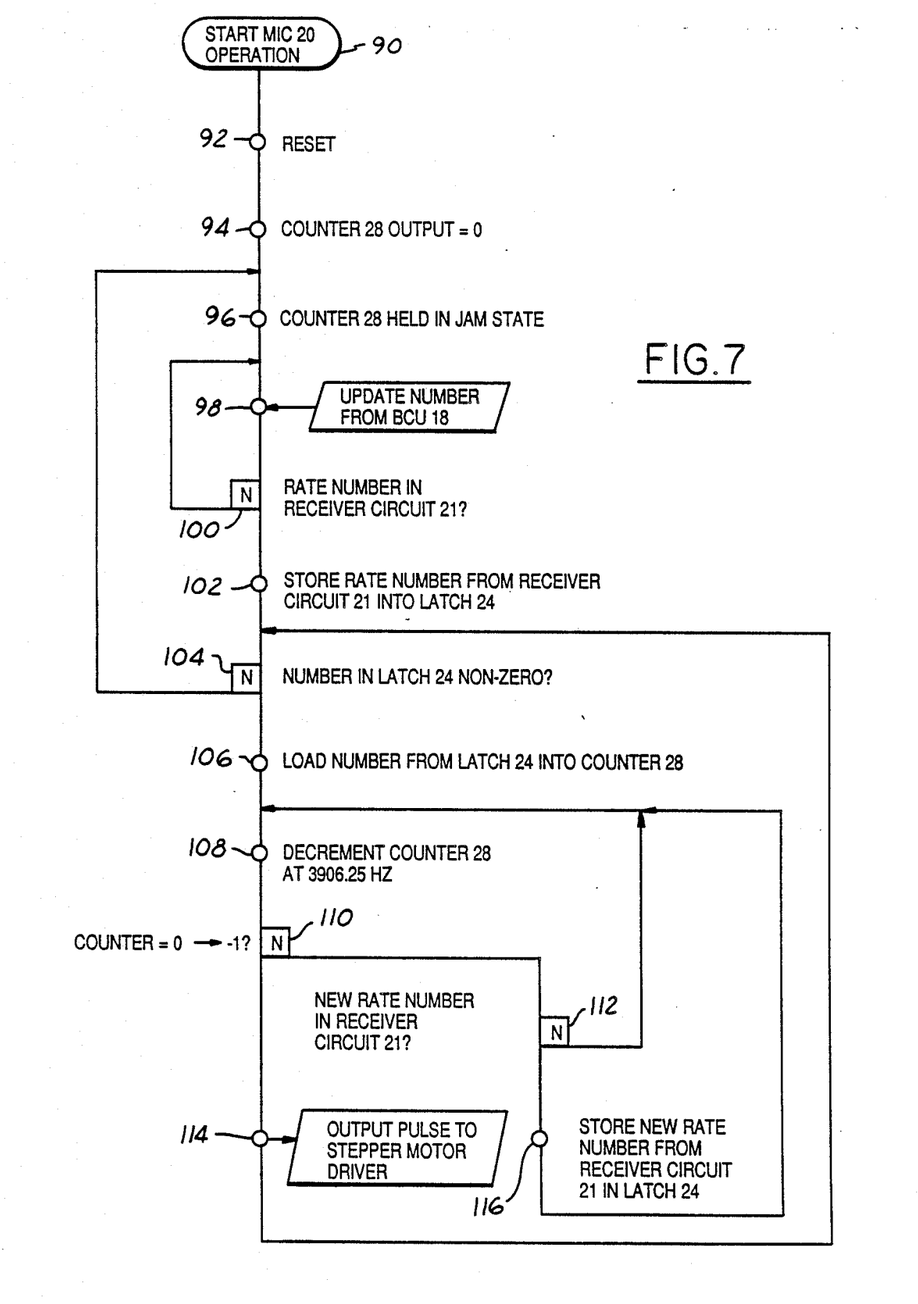
FIG. 7 is a flowchart illustrative of the operation of MIC 20 in providing control signals to stepper motor driver 30.

The flowcharts of FIGS. 5, 6 and 7 provide a description of the operation of the vehicle serial bus mechanical instrument cluster odometer system 10. Before describing the flowcharts, some comments are in order.

Flowchart diagrams of FIGS. 5, 6 and 7 differ from the conventional box and diamond flowchart. In these diagrams, the flow of control passes along the lines and proceed down the page. Conventional start-up of the program and end-of-program elongated circle symbols are used. Actions are signified by a small circle or dot on the lines with the description of the action being given to the left or right of the flow lines. Actions only take place on vertical lines. When a decision has to be introduced, the flow line branches to the right or the left. The branch may be caused by either a YES or NO condition, this being signified by a Y or N in a box as indicated. Where secondary flow rejoins the main flow, an arrowhead is used. The conventional trapezoid is used to indicate input or output operations. A reference number will indicate the point along the line being discussed.

Reference to FIG. 5, the start of the ECU 14 program (step 59), a computing circuit (CC-1) in ECU 14 is instructed to set a distance sensor switch counter to 0 (step 60). Afterwards, CC-1 is instructed to cause the distance sensor counter to count switch closures for 344 milliseconds (step 62). Then, The CC-1 of ECU 14 is instructed to transmit this distance count to BCU 18 (step 64) and then to return to step 60 where the switch is reset to receive the next series of switch closures.

FIG. 6 depicts the operation of a computer circuit (CC-2) in BCU 18. After starting the program in BCU 18 (step 69), the CC-2 in BCU 18 is instructed to set an error value to 0 for use in equation 2 (step 70). Then BCU 18 receives the distance counts number from ECU 14 (step 72). Then CC-2 is instructed to add the distance counts number to the error value (step 74) and then to compute the binary stepper motor rate number by employing equation (1) using the sum from step 74. The CC-2 of BCU 18 takes a ceiling function of the computed stepper motor rate number (step 78) to round up the number. Then the CC-2 in BCU 18 is instructed to transmit this binary stepper motor rate number to MIC 20 (step 80).

After the transmission of the stepper motor rate number to MIC 20, using this new stepper motor rate number, the CC-2 of BCU 18 computes the next error number (equation (2)) as indicated at step 82. Then the program loops back to step 72 to receive the next distance counts number from ECU 14.

The flow of circuit operation in MIC 20 is depicted in FIG. 7. After the start-up operation (step 90), the counters in latches and registers in MIC 20 are reset as indicated at step 92. The output of counter 28 is set at 0 as indicated at step 94. During this time, counter 28 is held in a jam state (step 96) by jamming logic 25.

MIC 20 receives the stepper motor rate number from BCU 18 as indicated at step 98. Then the receiver circuit 21 makes a determination whether the rate number received is from BCU 18 and can be used to update counter 28 as indicated at decision block 100. If the rate number is to be used to update the counter 28, then MIC 20 latches the rate number in latch 24 (step 102). If it is not a stepper motor rate number, then MIC 20 loops back to step 98 and looks again for the rate number from BCU 18.

MIC 20 makes another decision as to whether or not the number that is latched in latch 24 is 0 as in decision block 104. If it is 0, then MIC 20 loops back up to the step 96 to ensure that the counter 28 is held in a jam state and then looks again for another rate number from BCU 18 as in step 98. If the number in latch 24 is not 0, then that number is loaded into counter 28 (step 106). Then counter 28 is decremented down from the rate number to 0 and beyond to $-1$ at a frequency of 3906.25 Hz. Then a determination is made whether or not counter 28 has counted beyond 0 to $-1$ as indicated in decision block 110. If counter 28 has counted down to $-1$, then counter 28 outputs a pulse to stepper motor driver 30 and then motor driver circuit drives the stepper motor 32 and causes odometer 34 to be updated. Then the operation of the MIC 20 returns to step 104 to check again to see whether a new number in latch 24 is 0.

If counter 28 does not count down to $-1$, then the MIC 20 circuits check to see whether or not a new rate number is in receiver circuit 21. If not, the MIC 20 circuits continues to decrement counter 28 as indicated in step 108 until the $-1$ is reached. If a new number has been received by receiver circuit 21, then the new number is latched in latch 24 and MIC 20 continues to decrement counter 28 as indicated in step 108 until the $-1$ is reached.

It can be appreciated by those skilled in the art that with this scheme any uncorrected errors will tend to cancel out and not accumulate and that even under the severest conditions possible in a vehicle such errors are small, and further that this scheme permits computing reasonable odometer stepper count values which produce usable pulse rates.

I claim:

1. A firmware/hardware analog odometer unit for deriving a stepper motor pulse rate for a stepper motor of an analog odometer from a digital signal derived from a series of ON and OFF ground switch closures in proportion to the distance traveled by a vehicle provided by a distance sensor unit coupled to a drive train of a vehicle, said system comprising:
    (a) first computing means connected to the distance sensor unit for converting the series of switch closures of the digital signal into a series of integer distance counts numbers as the vehicle travels at various speeds over various distances, each distance counts number in the series representing an accumulated count of the switch closures during a chosen first time interval;
    (b) second computing means connected to said first computing means for computing from each of the distance counts numbers a corresponding binary stepper motor rate number during a chosen second time interval representing the rate at which to issue stepper motor pulses sufficient to cause a rotor of the stepper motor to rotate substantially continuously as the vehicle moves; and
    (c) stepper motor driver means connected to said second computing means for using said binary rate numbers to derive a series of pulses at a rate useful in driving the rotor of the stepper motor in response to changes in the value of the series of said distance count numbers so that the inertia of the rotor and a torque of the stepper motor produces generally regular odometer readings.

2. Apparatus in accordance with claim 1, including serial communication means for communicating between said first computing means, said second computing means and said stepper motor driver means, said serial communications means permitting transmission of said series of integer distance counts numbers from said first computing means to said second computing means during said first chosen interval, said serial communications means permitting transmission of said binary rate numbers that represent the rate of production of stepper motor pulses from said second computing means to said stepper motor driver means during the second chosen interval.

3. Apparatus in accordance with claim 1 wherein said second computing means includes (1) means for computing a current error value during said second chosen interval from a current stepper motor rate number and distance counts number and a previous error value wherein an initial previous error value has a value of zero and (2) means for summing the current error value with the current distance counts number to provide a corrected distance counts number useful for computing a next binary step motor rate number that represents the rate of stepper motor pulses.

4. Apparatus in accordance with claim 3 wherein said stepper motor driver means includes (1) a stepper motor driver for driving the stepper motor of the analog odometer, (2) a latch means for receiving and temporarily storing said binary rate number of stepper motor pulse rate computed by said second computing means and (3) a jammable counter means for using said binary rate number representing said current stepper motor pulse rate, said binary rate number being jammed in a plurality of registers of a jammable counter by said latch means to initiate a pulse after said jammable counter counts to a predetermined number, said jammable counter counting to the predetermined number at a rate inversely proportional to a value of the binary rate number jammed into said jammable counter during each of said second chosen intervals.

5. A firmware/hardware method for deriving a stepper motor pulse rate for a stepper motor of an analog odometer unit from digital signal derived from a series of grounded switch closures provided by a distance sensor unit coupled to a drive train of a vehicle, said method comprising the steps of:
    (a) programming a first computing means connected to the distance sensor unit to convert the digital signal into a series of integer distance counts numbers as the vehicle travels over various distances, each distance counts number in said series representing an assimilated count of the switch closures during a chosen first time interval;
    (b) programming a second computing means connected to said first computing means to compute from each of the distance counts numbers a corresponding binary number during a chosen second time interval that represents a stepper motor pulse rate number needed to cause a rotor of the stepper motor to rotate substantially continuously as the vehicle moves;
    (c) applying the stepper motor pulse rate number to a stepper motor driver means connected to said second computing means to generate a series of pulses at a rate useful in driving the rotor of the stepper motor in response to changes in the value of the series of said distance counts numbers so that the inertia of the rotor and a torque of the stepper motor produce generally regular odometer readings.

6. The method as recited in claim 5 wherein said step for computing from each of the distance count numbers a corresponding binary number includes (1) computing a current error value during said second chosen interval from a current binary number value and a previous error value wherein an initial error value has a value of zero and (2) summing the current error value with the current distance count to provide a corrected distance count for computing the next binary number of stepper motor pulses to be stored in said latch means of said stepper motor driver means.

7. The method as recited in claim 6 wherein said step for generating the series of pulses at a rate useful in driving the rotor include the steps of: (a) storing said current binary number value in a latch means; (b) if said binary number value in the latch means is not zero, jamming said number value into a jammable counter means; (c) decrementing said jammable counter means down from said number value to beyond zero to a −1 value at a chosen counter clock frequency; and (d) issuing a pulse to a stepper motor driver means at a rate proportional to the product of said number value and a pulse repetition period of the chosen counter clock frequency to cause said driver means to drive said stepper motor and, in turn, operates the analog odometer.

* * * * *